(12) United States Patent
Stigall et al.

(10) Patent No.: US 12,326,330 B2
(45) Date of Patent: Jun. 10, 2025

(54) METHOD AD APPARATUS FOR DIGITAL THREAD INSPECTION (71) Applicant: Tubular Solutions, Inc., Houston, TX (US)

(72) Inventors: Aubrey A. Stigall, Houston, TX (US); Timothy M. Bedore, Houston, TX (US)

(73) Assignee: TUBULAR SOLUTIONS, INC., Houston, TX (US)

( * ) Notice: Subject to any disclaimer, the term of this patent is extended or adjusted under 35 U.S.C. 154(b) by 237 days.

(21) Appl. No.: 18/171,570

(22) Filed: Feb. 20, 2023

(65) Prior Publication Data

US 2023/0204346 A1 Jun. 29, 2023

Related U.S. Application Data

(63) Continuation-in-part of application No. 16/995,690, filed on Aug. 17, 2020, now abandoned, which is a
(Continued)

(51) Int. Cl.
| | |
|---|---|
| *G01B 11/245* | (2006.01) |
| *G01B 11/12* | (2006.01) |
| *G01B 11/24* | (2006.01) |
| *G01B 17/06* | (2006.01) |
| *F16L 101/30* | (2006.01) |

(52) U.S. Cl.
CPC ............ *G01B 11/245* (2013.01); *G01B 11/12* (2013.01); *G01B 11/2408* (2013.01); *G01B 17/06* (2013.01); *F16L 2101/30* (2013.01)

(58) Field of Classification Search
CPC ...... F16L 2101/30; G01B 11/02; G01B 11/12; G01B 11/2408; G01B 11/245; G01B 17/06; G06F 3/0482; G06Q 10/025; H04L 51/046; H04L 65/40
See application file for complete search history.

(56) References Cited

U.S. PATENT DOCUMENTS 5,195,392 A * 3/1993 Moore .................... F16L 55/18
356/241.3
5,712,706 A * 1/1998 Castore .............. G01B 11/2425
356/601

(Continued)

OTHER PUBLICATIONS

PCT International Search Report and Written Opinion dated Jan. 22, 2024 (copy attached).

*Primary Examiner* — Tri T Ton
(74) *Attorney, Agent, or Firm* — Ted M. Anthony (57) ABSTRACT

A compact inspection assembly comprising digital sensors and/or laser measurement systems to measure and validate attributes of pipe and associated threaded connections. A custom designed end-effector sensor assembly is selectively attached to a robotic arm having software and control systems. An automated sensor assembly, selectively positioned relative to a pipe section, measures data regarding the pipe and associated threaded connections. The measured and recorded data can be inspected for defects and/or compared to predetermined standards (such as, for example, original equipment manufacturer and/or end user specifications or requirements) to verify pipe/connection compliance with desired standards.

14 Claims, 10 Drawing Sheets

Related U.S. Application Data continuation of application No. 16/155,274, filed on Oct. 9, 2018, now Pat. No. 10,746,538, which is a continuation of application No. 15/810,358, filed on Nov. 13, 2017, now Pat. No. 10,119,810.

(60) Provisional application No. 62/421,615, filed on Nov. 14, 2016.

(56) References Cited

U.S. PATENT DOCUMENTS

| | | |
|---|---|---|
| 2011/0164244 A1 | 7/2011 | Honda |
| 2011/0238199 A1* | 9/2011 | Bonadeo ............ G01B 11/2425 700/109 |
| 2018/0135974 A1 | 5/2018 | Stigall et al. |
| 2022/0057288 A1 | 2/2022 | Roberts et al. |

* cited by examiner

METHOD AD APPARATUS FOR DIGITAL THREAD INSPECTION

CROSS REFERENCES TO RELATED APPLICATIONS: THIS APPLICATION IS

A CONTINUATION-IN-PART OF U.S. patent application Ser. No. 16/995,690, FILED Aug. 17, 2020, CURRENTLY PENDING, WHICH IS A CONTINUATION OF U.S. patent application Ser. No. 16/155,274, FILED Oct. 9, 2018 (NOW U.S. Pat. No. 10,746,538 B2 ISSUED ON Aug. 18, 2020), WHICH CLAIMS PRORITY OF U.S. patent application Ser. No. 15/810,358, FILED Nov. 13, 2017 (NOW U.S. Pat. No. 10,119,810B2 ISSUED ON Nov. 6, 2018) WHICH CLAIMS PRIORITY OF U.S. PROVISIONAL PATENT APPLICATION Ser. No. 62/421,615, FILED Nov. 14, 2016, ALL INCORPORATED HEREIN BY REFERENCE.

STATEMENTS AS TO THE RIGHTS TO THE INVENTION MADE UNDER FEDERALLY SPONSORED RESEARCH AND DEVELOPMENT: NONE

BACKGROUND OF THE INVENTION

1. Field of the Invention

The present invention pertains to a method and apparatus for comprehensive inspection of pipe sections and other tubular goods including, without limitation, threaded connections thereof. More particularly, the present invention pertains to a method and apparatus for comprehensive digital inspection of pipe sections and other tubular goods, as well as associated threaded connections, in order to measure a variety of different data including, without limitation, tube length, inside diameter ("ID") and outer diameter ("OD"), as well as to image threaded connection data. More particularly still, the present invention pertains to a method and apparatus for comprehensive digital inspection of pipe sections and other tubular goods, as well as associated threaded connections, utilizing some combination of integrated laser measurement, optical sensors, phased-array and/or ultrasonic transducer ("UT") technology.

2. Brief Description of the Prior Art

Pipe (such as, for example, casing, drill pipe and/or other tubular goods) is commonly used in the oil and gas industry, as well as other applications. Such pipe is typically utilized in linear sections having a length of thirty feet or more, as well as various length smaller sections ("pup joints"), accessories and/or other components that may be utilized in a pipe string design. Each pipe section—commonly referred to as a "joint"—typically has a threaded connection disposed at each axial end. In many cases, each pipe section has one male or "pin-end" connection at one end, and a female or "box-end" connection at the other end. In other cases, pipe sections can have male or pin-end connections at both ends and can be joined together using an internally threaded coupling or collar member.

In order to ensure safety and operational integrity, such pipe sections and associated threaded connections are commonly inspected for quality assurance purposes. Conventional thread inspection methods are typically performed using an inspector's naked eye—the inspector visually inspects a pipe section and its threaded connections, and thereafter assigns a qualitative grade or rating to said connections based on the inspector's visual observation and subjective determination.

Such visual thread inspection, commonly referred to as "VTI", suffers from a number of significant limitations. Grading can be subjective, can vary between inspectors, and external conditions and/or environmental factors can also impact the quality of VTI and the associated results. Put another way, such conventional VTI methods rely entirely on human interaction and interpretation for accuracy and compliance; as such, said conventional methods of VTI can be inconsistent and subject to human error. In some cases, improperly inspected or inconsistently graded pipe and associated threaded connections can result in problems (which can sometimes be catastrophic) when pipe is subsequently used during operations.

Thus, there is a need for an improved method and apparatus for inspecting pipe sections including, without limitation, threaded connections thereof. Such improved method and apparatus should account for differences in environmental conditions, while reducing—if not entirely eliminating—human error and inspector subjectivity. Further, such improved method and apparatus should be effective, as well as relatively affordable and easy to deploy and utilize.

SUMMARY OF THE PRESENT INVENTION

The present invention comprises a method and apparatus for digital inspection of pipe sections and associated threaded connections. In a preferred embodiment, the present invention comprises an automated inspection assembly employing digital imaging and laser measurement systems to validate desired attributes of a tubular goods and associated threaded pipe connection(s) including, without limitation, verification of measured values against known standards (such as, for example, original equipment manufacturer ["OEM"] and/or end-user specifications). Further, the method and apparatus of the present invention utilizes specifically calibrated equipment to objectively verify threaded connection characteristics without requiring or relying on human subjectivity for accuracy and compliance.

In a preferred embodiment, the digital inspection assembly of the present invention employs a digital sensor head apparatus that can be selectively moved relative to a pipe section and associated threaded connection(s) using a robotic positioning device. Although other embodiments can be envisioned without departing from the scope of the present invention, said robotic positioning device can comprise a robotic arm assembly having a plurality of articulating arm members, as well as an operating or control system. Said digital sensor head apparatus can be positioned at or near the distal end of said robotic positioning device, and can be selectively moved and repositioned by said robotic positioning device.

Said digital sensor head apparatus can include a plurality of sensors and/or other data-acquisition devices including, without limitation, at least one digital camera(s), laser optics (such as 2-dimensional or 3-dimensional laser digital sensors) and/or optical digital sensors. Said digital sensor head apparatus can be selectively positioned relative to a pipe section and/or associated threaded connection(s) using said robotic positioning device. By way of illustration, but not limitation, said digital sensor head apparatus can be used to acquire desired optical images of pipe tube bodies and/or (male or female) threaded connections. In a preferred embodiment, said digital sensor head apparatus can be positioned in proximity to a threaded connection and can be rotated up to 360 degrees about a longitudinal axis, thereby permitting said digital sensor head apparatus to inspect and examine a pipe section and/or threaded connection around its entire circumference.

The digital inspection assembly of the present invention can be beneficially motorized, allowing for automated movement of said digital sensor head apparatus relative to a tubular good and/or any associated threaded connection(s). Moreover, said movement can be precisely controlled. For example, said digital sensor head apparatus can be rotated at a constant or adjustable rotational speed. Additionally, controlled lighting and imaging systems provide for enhanced accuracy and calibrated imaging, while accommodating pipe and other tubular goods having an outer diameter of up to 22 inches or more.

Further, in a preferred embodiment, said digital inspection assembly can provide for self-centering, auto-focus and desired alignment of said digital sensor head apparatus relative to a pipe section and any associated threaded connection(s) thereof. Although other methods can be envisioned without departing from the scope of the present invention, such functions are controlled using Computer Numerically Controlled ("CNC") software and control systems.

An automated laser length and pipe diameter measurement system, which can also be controlled by custom-designed software, utilizes at least one laser measurement tool and permits accurate measurement of pipe section length, internal diameter and pipe ovality. When two opposing digital inspection assemblies are utilized (typically one at each end of a pipe section), said two-station system can be synced with each other for inspection optimization. In such scenarios, multiple threaded connections can be inspected simultaneously, with lighting, imaging, motor automation and laser applications working together, while being controlled from a common or central control panel.

The digital inspection assembly of the present invention can be portable, allowing for mobile deployment and use at virtually any location (such as, for example, pipe yards, mills, rigs, remote or other locations). In an alternative embodiment, said digital inspection assembly can be mounted to a temporary support structure, or permanently supported. Modular design of the digital inspection assembly allows for incorporation of additional components and complete remote automation.

Measured data can be utilized with an automated pipe grade verification system, and/or stored on a local or cloud-based data storage system. Further, such measured data can be accessed for comparison and/or verification including, without limitation, that: connection attributes are within OEM or other standards for acceptable connection tolerances, ovality is within desired API or other specifications or standards, and/or connection tolerances for mating pin and box threaded connections will ensure optimal connection performance in operation. Additionally, data from laser topography and/or digital optical sensor(s) can verify that any defects are within acceptable tolerances relative to OEM specifications and/or other applicable standards.

Additionally, real time data acquisition and Wi-Fi connectivity allows for remote viewing of measured data from any location (including, without limitation, GSM, 3G, 4G, 5G, Bluetooth, Wi-Fi, satellite and/or cabled networks). PDF or other specific application conversion of all images, lengths, defects, acceptance criteria and all system set up parameters for electronic report generation and delivery. The present invention can beneficially operate off of external power and does not require an internal battery for operation.

The digital inspection assembly of the present invention can permit inspection of multiple attributes of male and/or female threaded connections including, without limitation, the following: thread image, nose image, seal area, shoulders, relief grooves, roots, crests, pitch (including variable pitch), diameter, pipe OD, pipe ID, pipe ovality and/or other measurable variables. A report containing acquired data and any analysis can be automatically generated and forwarded to desired recipients. Connection inspection information can be numbered, time-stamped and dated for traceability and archival purposes.

In a preferred embodiment, the digital inspection assembly of the present invention can be beneficially operated and utilized by a single person. Further, the digital inspection assembly is accurately repeatable (that is, duplicate inspections of the same pipe/connection will yield identical results within measurement tolerances).

BRIEF DESCRIPTION OF THE DRAWINGS

The foregoing summary, as well as the following detailed description of the preferred embodiments, is better understood when read in conjunction with the appended drawings. For the purpose of illustrating the invention, the drawings show certain preferred embodiments. It is understood, however, that the invention is not limited to the specific methods and devices disclosed. Further, dimensions, materials and part names are provided for illustration purposes only and not limitation.

DETAILED DESCRIPTION OF A PREFERRED EMBODIMENT OF THE INVENTION

The digital inspection assembly of the present invention generally comprises a sensor head apparatus operationally attached to a programmable robotic motion control assembly. In a preferred embodiment, said robotic motion control assembly generally can comprise a plurality of interconnected members that cooperate to function as an articulating mechanical arm that can be programmed and/or selectively controlled from nearby or remote locations. Said sensor head apparatus can be generally disposed at or near the distal end of said articulating mechanical arm and can be selectively positioned (and repeatedly repositioned) in relative proximity to tubular goods, such as a pipe section having connection threads.

Figure 1:
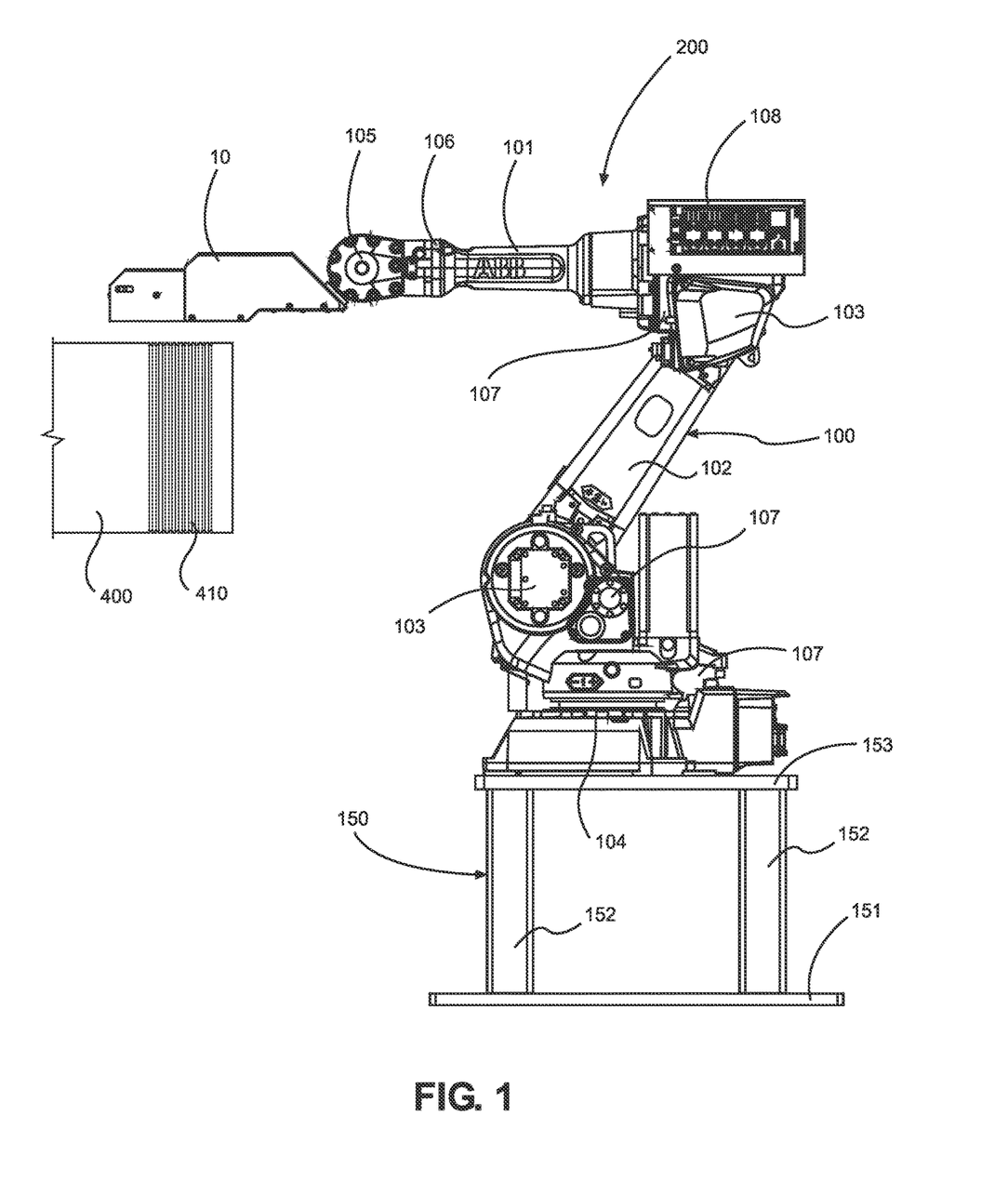
FIG. 1 depicts a side view of a digital inspection assembly of the present invention situated in proximity to a conventional pipe section and threaded connection thereof.

FIG. 1 depicts a side view of a digital inspection assembly 200 of the present invention situated in relative proximity to a pipe section 400 having threaded connection 410. It is to be observed that pipe section 400 can comprise a section of casing, drill pipe, production tubing or other tubular good. Further, although threads 410 of pipe section 400 are depicted in FIG. 1 (as well as FIGS. 3, 11, 12, 13, 14 and 15) as being male or "pin-end" connection threads, digital inspection assembly 200 can also be effectively utilized in connection with female or "box-end" threads without departing from the scope of the present invention.

As depicted in FIG. 1, digital inspection assembly 200 can be fixedly mounted to a permanent support platform or other riser structure 150. However, it is to be observed that, alternatively, said digital inspection assembly 200 of the present invention can be portable or otherwise mounted to a temporary or movable support structure, thereby allowing for mobile deployment and use at virtually any location (such as, for example, pipe yards, mills, drilling rigs, remote or other locations). By way of illustration, but not limitation, said digital inspection assembly 200 can be mounted on rollers or casters, or a rail or track mechanism, thereby permitting selective positioning of said digital inspection assembly 200 relative to pipe to be inspected.

In the exemplary mounting configuration depicted in FIG. 1, robotic motion control assembly 100 is mounted on stationary riser platform 150. Although other configurations can be employed, said stationary riser platform 150 generally comprises planar foot member 151, a plurality of vertical legs 152 and upper planar mounting base 153. Notwithstanding the foregoing, said stationary riser platform 150 can comprise other combinations or configurations of support base members, support legs, cross members, and the like. Stationary riser platform 150 provides a stable platform base for mounting digital inspection assembly 200.

Robotic motion control assembly 100 generally comprises a plurality of cooperating articulating arm members 101 and 102; said articulating arm members 101 and 102 are joined by pivotal connection members 103 that permit movement of said arm members 101 and 102 in different planes. Robotic motion control assembly 100 can be operationally mounted to stationary support riser platform 150 using rotating table apparatus 104, which permits rotation of at least a portion of said robotic control assembly 100 around a substantially vertical axis of rotation.

Sensor head apparatus 10 is disposed at the distal end 106 of robotic motion control assembly 100 and is operationally attached to said robotic motion control assembly 100 by end swivel mount 105. A plurality of motors 107 can power movement of said articulating arm members 101 and 102 of said robotic motion control assembly 100, as well as movement about pivotal connection members 103, rotating table apparatus 104 and swivel end mount 105.

Although other configurations can be envisioned without departing from the scope of the present invention, said motors 107 and movement of said articulating arm members 101 and 102 can be controlled using Computer Numerically Controlled ("CNC") software and robotic motion control systems well known to those having skill in the art. Notwithstanding the foregoing, it is to be understood that said robotic motion control assembly 100 (including, without limitation, valve pack 108) can be fully or partially electrically powered, with motion provided using electric motors and associated robotic automation components well known to those having skill in the art.

Figure 2:
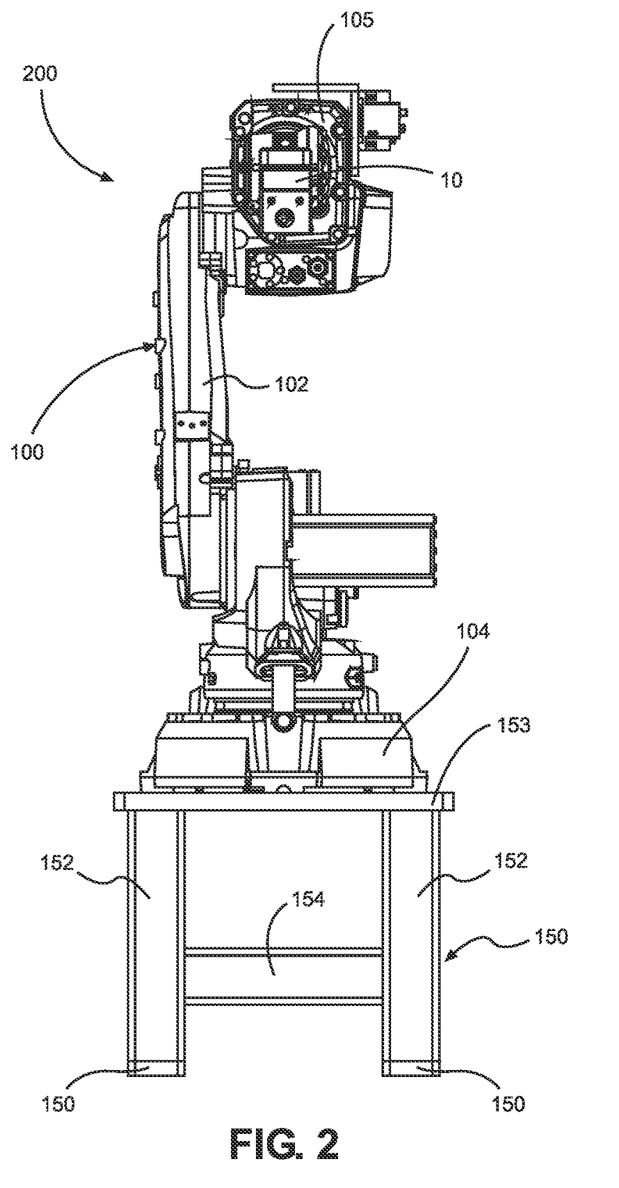
FIG. 2 depicts a front view of the digital inspection assembly of the present invention.

FIG. 2 depicts a front view of said digital inspection assembly 200. Said digital inspection assembly 200 can be fixedly mounted to support riser platform 150. In the depicted embodiment, said stationary support riser platform 150 generally comprises planar base members 151, a plurality of vertical legs 152, horizontal support beam 154 and upper planar mounting base 153. Robotic motion control assembly 100 generally comprises a plurality of articulating arm members (including arm member 102), and is operationally mounted to stationary support riser platform 150 using rotating table apparatus 104. Sensor head apparatus 10 is operationally attached to robotic motion control assembly 100 using end swivel mount 105.

Figure 3:
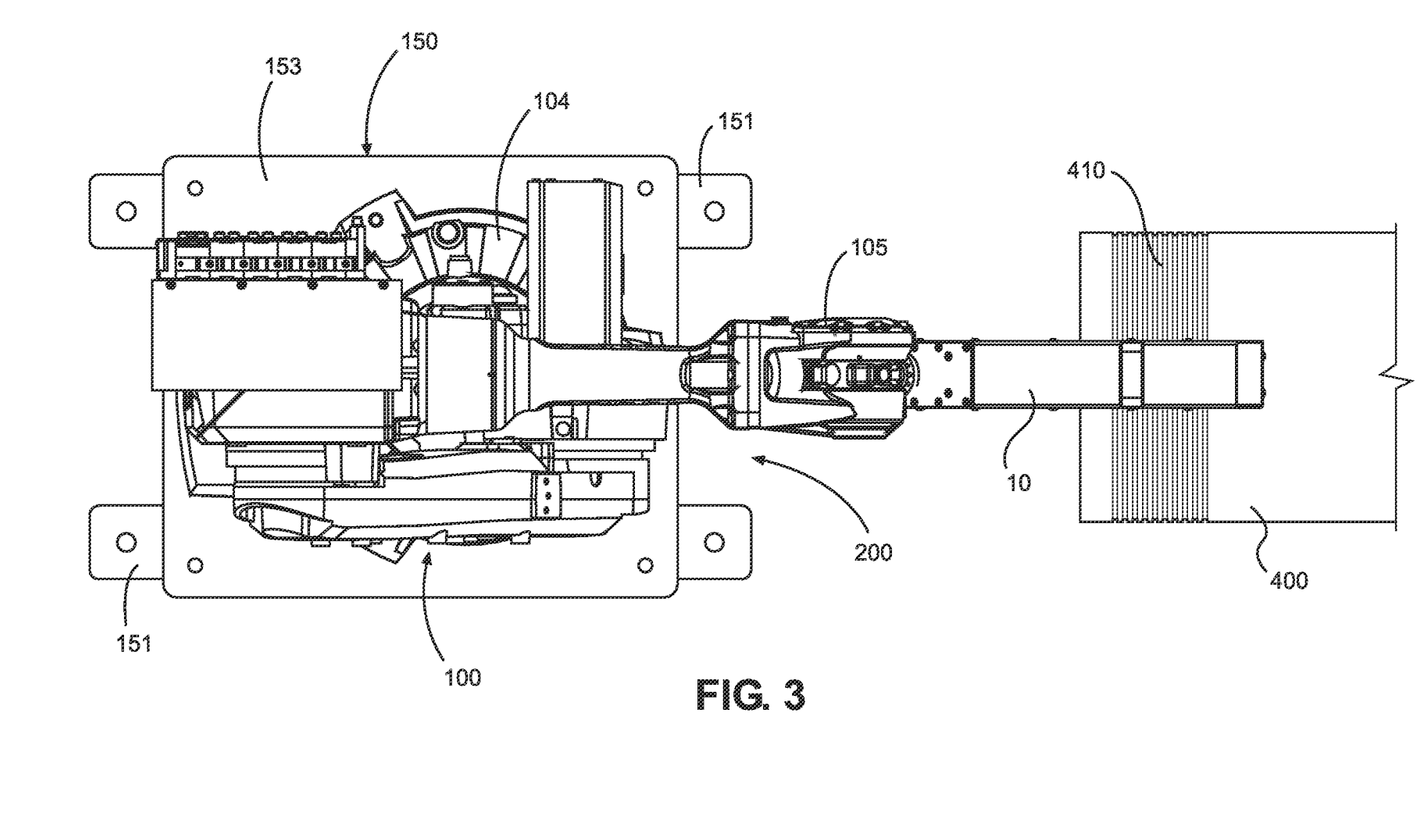
FIG. 3 depicts an overhead view of a digital inspection assembly of the present invention situated in proximity to a conventional pipe section and threaded connection thereof.

FIG. 3 depicts an overhead view of said digital inspection assembly 200 of the present invention situated in relative proximity to said pipe section 400 having threaded connection 410. Digital inspection assembly 200 can be fixedly mounted to support riser platform 150 generally comprising planar base members 151 and upper planar mounting base 153. Robotic motion control assembly 100 (exemplary components of which are more fully described in FIG. 1) is operationally mounted to stationary support riser platform 150 using rotating table apparatus 104. Sensor head apparatus 10 is operationally attached to robotic motion control assembly 100 using end swivel mount 105.

Figure 4:
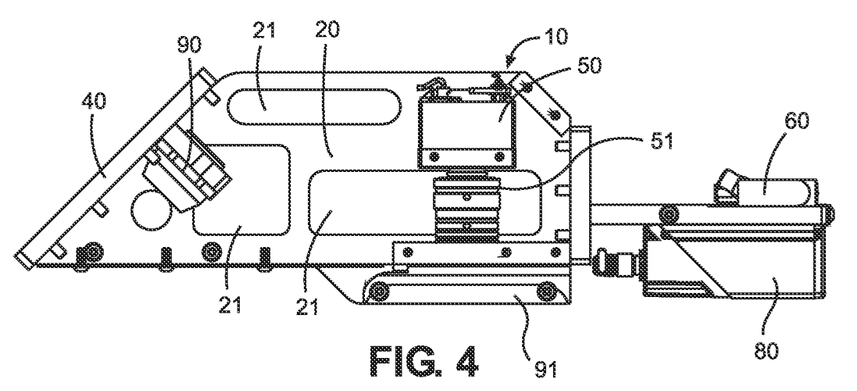
FIG. 4 depicts a first side view of a sensor head apparatus of the present invention (with a protective cover removed).
Figure 6:
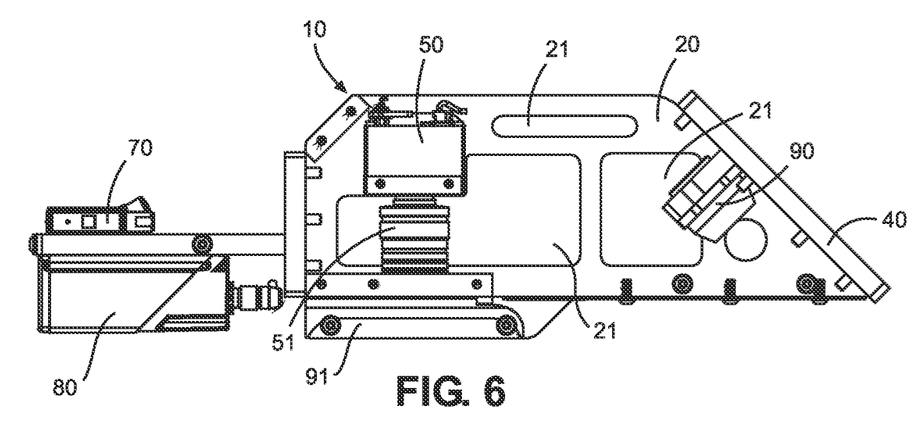
FIG. 6 depicts a second side view of a sensor head apparatus of the present invention (with a protective cover removed).

FIG. 4 depicts a first side view of a sensor head apparatus 10 of the present invention (with a protective cover removed), while FIG. 6 depicts a second side view of a sensor head apparatus 10 of the present invention with said protective cover removed. In a preferred embodiment, said digital inspection apparatus 10 generally comprises a support frame 20 that can optionally include cut-out sections 21; said cut-out sections 21 can reduce overall weight and improve maneuverability of said sensor head apparatus 10.

Referring to FIGS. 4 and 6, in a preferred embodiment, sensors and related accessories can be operationally mounted to said support frame 20 of sensor head apparatus 10. More specifically, camera 50 having lens 51 is attached to support frame 20. First laser 60, second laser 70 and third laser 80 are also operationally attached to said support frame 20. Additionally, first light source 90 and second light source 91 are also attached to said support frame 20. Optional connection plate 40 can be used to operationally attach said sensor head apparatus 10 to robotic motion control assembly 100.

Figure 5:
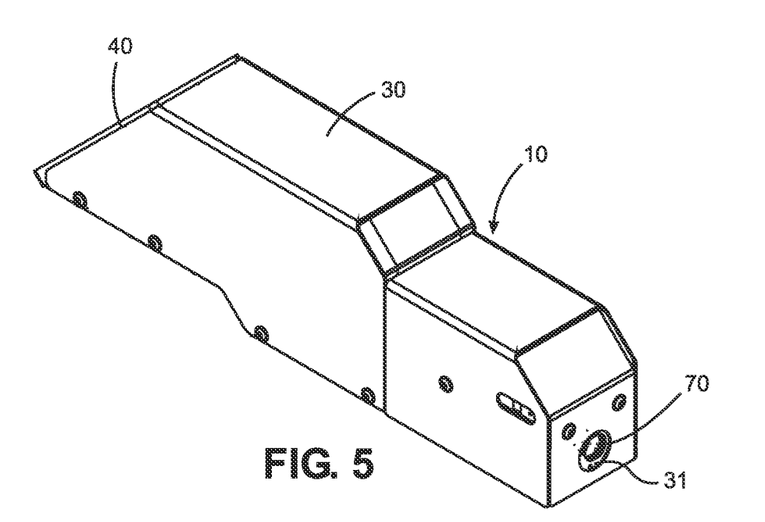
FIG. 5 depicts a perspective overhead view of a sensor head apparatus (with a protective cover installed).

FIG. 5 depicts an overhead perspective view of a sensor head apparatus 10 with a protective cover 30 installed. Cover 30 encloses and protects components mounted to support frame 20 from damage caused by inadvertent contact with other objects and/or exposure to environmental elements. Although other shapes and sizes can be envisioned, in a preferred embodiment sensor head apparatus 10 forms an elongated head which can be easily and conveniently positioned and manipulated by robotic motion control assembly 100. Aperture 31 is positioned within cover 30 and is generally aligned with said third laser 80

Figure 7:
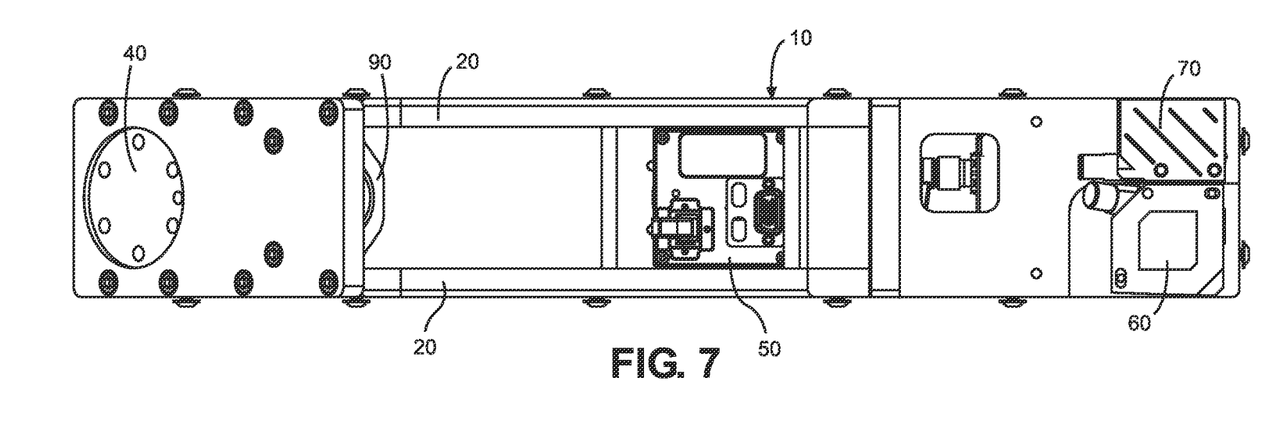
FIG. 7 depicts a top view of a sensor head apparatus of the present invention (with a protective cover removed).

FIG. 7 depicts a top view of sensor head apparatus 10 of the present invention (with protective cover 30 removed). Camera 50 is attached to support frame 20 and directed generally toward the bottom of said sensor head apparatus 10. First laser 60, second laser 70 and first light source 90 are operationally attached to said support frame 20. Additionally, optional connection plate 40 can be used as an interface to operationally attach said sensor head apparatus 10 to a robotic motion control assembly, such as robotic motion control assembly 100 (not pictured in FIG. 7).

Figure 8:
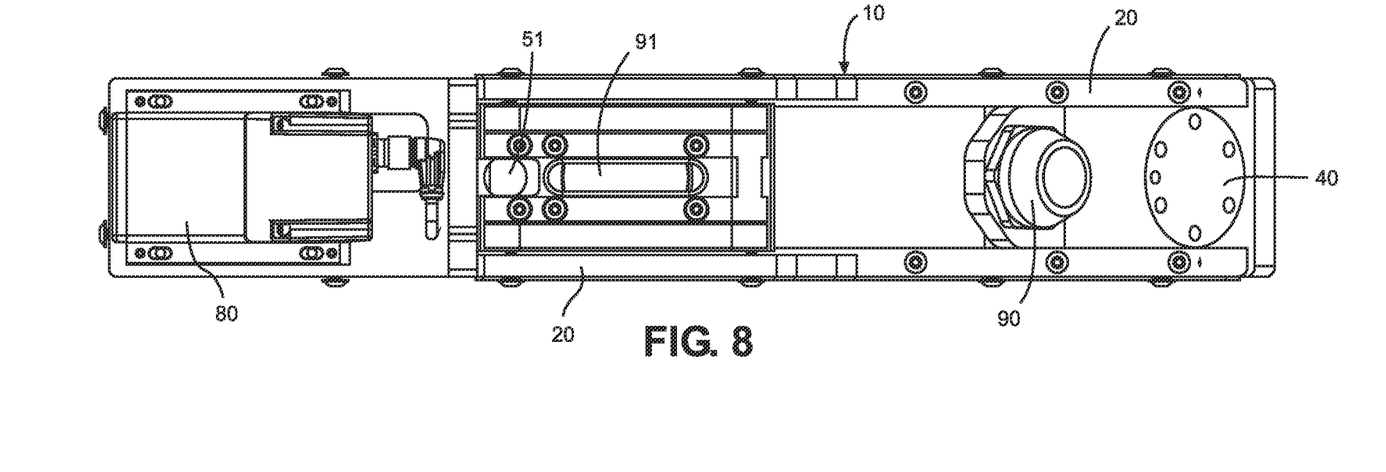
FIG. 8 depicts a bottom view of a sensor head apparatus of the present invention (with a protective cover removed).

FIG. 8 depicts a bottom view of said sensor head apparatus 10 of the present invention (again with protective cover 30 removed). Camera lens 51 is attached to support frame 20. Third laser 80, as well as first light source 90 and second light source 91, are also operationally attached to said support frame 20.

Figure 9:
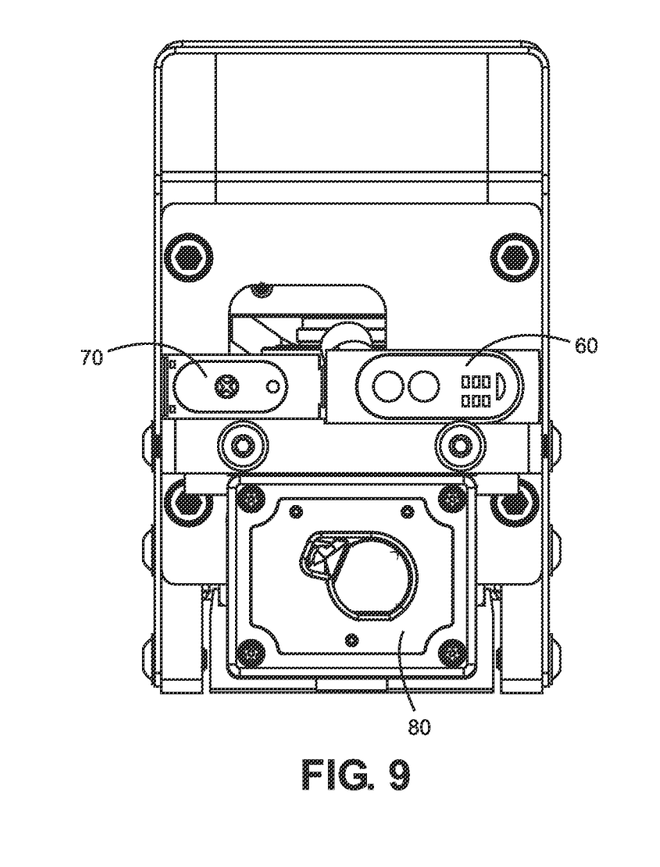
FIG. 9 depicts a front end view of a sensor head apparatus of the present invention.
Figure 10:
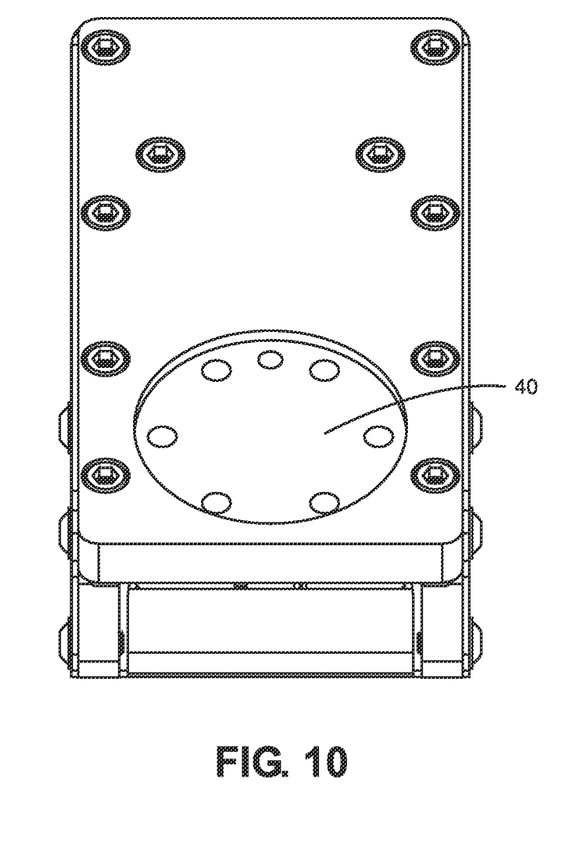
FIG. 10 depicts a rear end view of a sensor head apparatus of the present invention.

FIG. 9 depicts a front end view of a sensor head apparatus 10 of the present invention, while FIG. 10 depicts a rear end view of said sensor head apparatus 10. Referring to FIG. 9, first laser 60, second laser 70 and third laser 80 are operationally attached to said support frame 20. Referring to FIG. 10, connection plate 40 can be used to operationally attach said sensor head apparatus 10 to robotic motion control assembly 100.

Referring to the drawings, and particularly FIGS. 4 through 10, it is to be observed that the layout and selection of components disposed on sensor head apparatus 10 can be adjusted or modified in order to meet particular job parameters or other objectives without departing from the scope of the present invention. In a preferred embodiment, said first laser 60 can comprise a laser distance sensor bearing Model No. "VDM18-100/32/105/122" and marketed by Pepperl+Fuchs. Said second laser 70 can comprise an optical laser distance sensor bearing Model No. "ODSL 8" marketed by Leuze electronic, Inc. Said third laser 80 can comprise an optical laser distance sensor bearing Model No. "DAE-10-050" marketed by Dimetix AG. It is further to be observed that said laser brands and models are exemplary only, and are not intended to be limiting in any way; different types, brands and/or numbers of lasers and/or optical sensors can also be used, if desired.

In a preferred embodiment, first laser 60 can comprise a relatively "high resolution" laser for determining relative distance from an object, such as a pipe section and/or threaded connection end thereof. More specifically, relatively "lower resolution" second laser 70 can be used to locate said X/Y axis of a threaded connection end, while said "high resolution" first laser 60 can be used to locate the X/Y axis of said threaded connection end. Third laser 80 can be used to measure the overall length ("OAL") of said pipe, typically along the internal surface of said pipe section, calculated from one end of the pipe section to the opposite end of said pipe section.

In operation, relatively "low resolution" second laser 70 can initially be utilized to find the rough X/Y axis of a pipe section. Thereafter, "high resolution" first laser 60 can be employed to more accurately locate the "true" X/Y axis of said pipe section. Once said actual axis has been determined, third laser 80 can use the data from lasers 60 and 70, to accurately determine each end of a pipe section and measure the OAL of the pipe section as mentioned previously.

One or more imaging devices (such as camera 50) may be used to capture digital images of a pipe section and related threaded connection, and/or to perform image recognition. The imaging device may be associated with a computing system of digital inspection assembly 200. The computing system may have a processor and memory storing code executable by the processor for computer-implemented storage of digital images and performance of image recognition, and so on. The image recognition may generally identify and detect aspects of a pipe section and any associated threaded connection(s). In some examples, pattern matching, data analysis, visualization, comparative three-dimensional (3D) models, procedure development, and the like, may be employed in the image recognition. The detected features may be compared to known features data stored in computer memory, and the image recognition may, for instance, identify and extract features from images captured via the imaging device and input the extracted features.

Digital inspection assembly 200 may also include a hardware processor and memory. The processor may be a microprocessor, central processing unit (CPU), or other types of circuitry, while the memory may include volatile memory, non-volatile memory, and/or other types of memory. Said memory may store code (e.g., instructions, logic and/or commands) executed by a processor in the control of digital inspection assembly 200. Said processor and memory may sometimes be collectively referred to as a controller or computing system of digital inspection assembly 200.

The digital inspection assembly 200 or computing system thereof may include, for example, at least one integrated circuit, at least one printed circuit board, at least one printed circuit assembly or printed circuit board assembly, at least one application-specific integrated circuit, at least one programmable logic controller, at least one component of a distributed control system, at least one field-programmable gate array, and/or other types of circuitry. Firmware may also be employed, which may be code embedded on the controller such as programmed into, for example, read-only memory or flash memory. Firmware may be instructions or logic for the controller hardware and may facilitate control, monitoring, data manipulation, and so on, by the controller. Digital inspection assembly 200 (including, without limitation, a controller or computer system thereof) may be communicatively coupled with device(s) remote from said digital inspection assembly 200. Moreover, remote computing systems may also supplement operation of digital inspection assembly 200.

Figure 11:
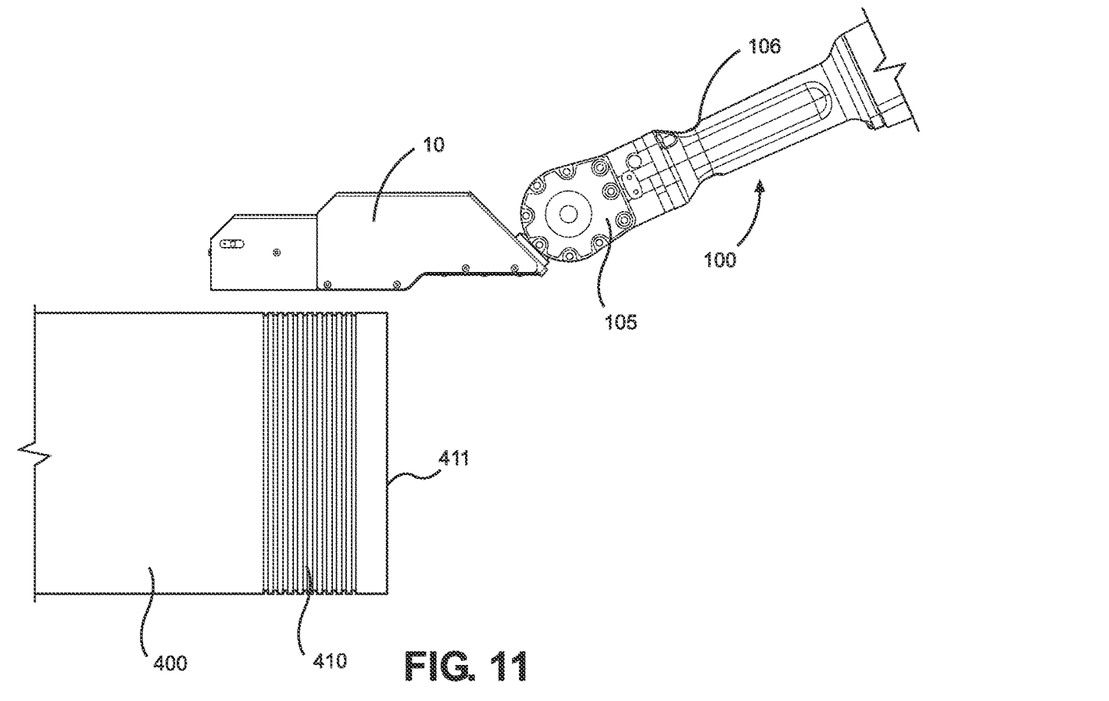
FIG. 11 depicts a first side view of a portion of the digital inspection assembly of the present invention during inspection of a pipe section having a conventional threaded connection.

FIG. 11 depicts a first side view of a portion of digital inspection assembly 200 of the present invention during inspection of a pipe section 400 having threaded connection 410 and end face/surface 411 (sometimes referred to as a "nose"). Sensor head apparatus 10 is disposed at the distal end 106 of robotic motion control assembly 100 via end swivel mount 105. Robotic motion control assembly 100 permits omnidirectional movement of sensor head apparatus 10, as well as selective positioning of said sensor head apparatus 10 relative to pipe section 400 and threaded connection 410 thereof. As depicted in FIG. 11, the longitudinal axis of sensor head apparatus 10 is oriented substantially parallel to the longitudinal axis of pipe section 400, and said sensor head apparatus 10 is capable of sensing data over entirety of threaded connection 410.

Figure 12:
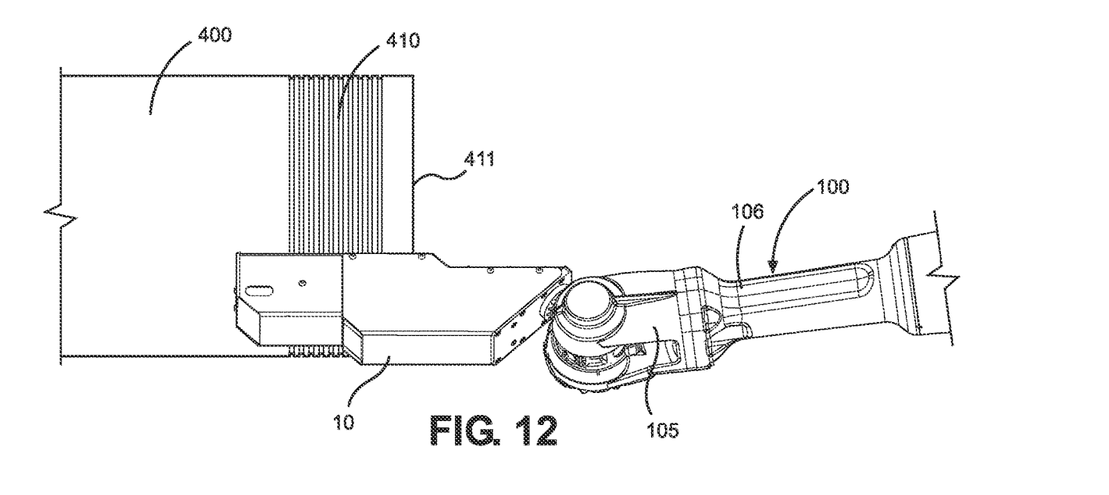
FIG. 12 depicts a second side view of a portion of the digital inspection assembly of the present invention during inspection of a pipe section having a conventional threaded connection.

FIG. 12 depicts a second side view of a portion of the digital inspection assembly 200 of the present invention during inspection of a pipe section 400 having threaded connection 410 and end face/surface 411. It is to be observed that sensor head apparatus 10 is selectively positioned adjacent to a different portion of threaded connection 410 compared to the positioning shown in FIG. 11 (that is, a different position around the circumference of said pipe section 400 compared to FIG. 11). Sensor head apparatus 10 can inspect, sense and record measured data from different portions of pipe section 400 and threaded connection 410 compared to the positioning depicted in FIG. 11. As depicted in FIG. 12, the longitudinal axis of sensor head apparatus 10 is oriented substantially parallel to the longitudinal axis of pipe section 400, permitting said sensor head apparatus 10 to sense data over the entirety of threaded connection 410.

Figure 13:
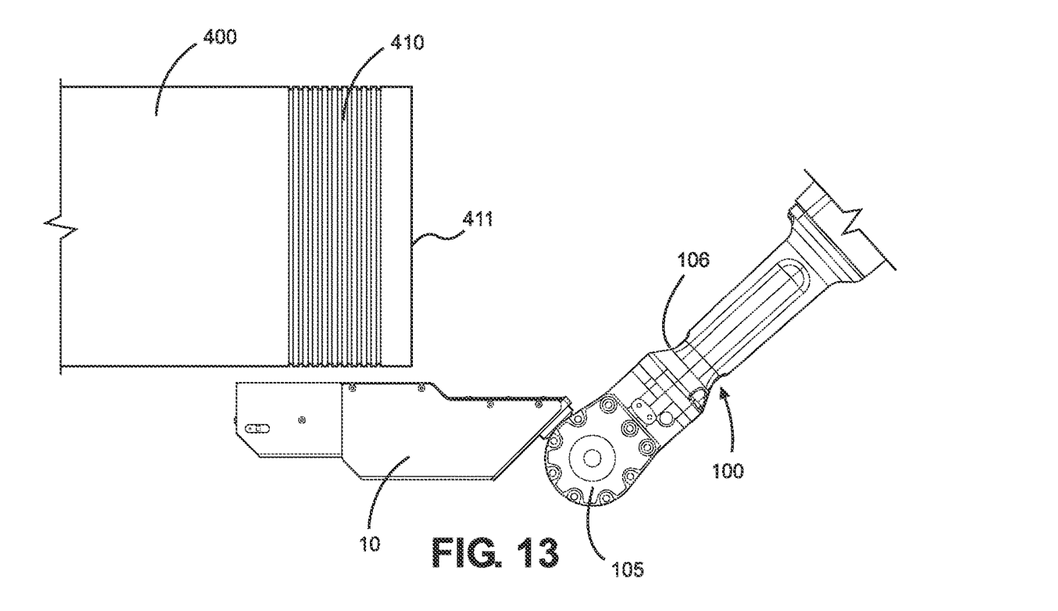
FIG. 13 depicts a third side view of a portion of the digital inspection assembly of the present invention during inspection of a pipe section having a conventional threaded connection.

Similarly, FIG. 13 depicts a third side view of a portion of digital inspection assembly 200 of the present invention during inspection of pipe section 400 having threaded connection 410 and end face/surface 411. As depicted in FIG. 13, sensor head apparatus 10 is again selectively positioned adjacent to a different portion of pipe section 400 and threaded connection 410 compared to the configurations shown in FIGS. 11 and 12 (that is, a different position around the circumference of said pipe section 400 compared to FIGS. 11 and 12). Sensor head apparatus 10 can inspect, sense and record measured data from different portions of pipe section 400 and threaded connection 410 compared to the positioning depicted in FIGS. 11 and 12. The longitudinal axis of sensor head apparatus 10 is oriented substantially parallel to the longitudinal axis of pipe section 400, permitting said sensor head apparatus 10 to sense data over the entirety of threaded connection 410.

Figure 14:
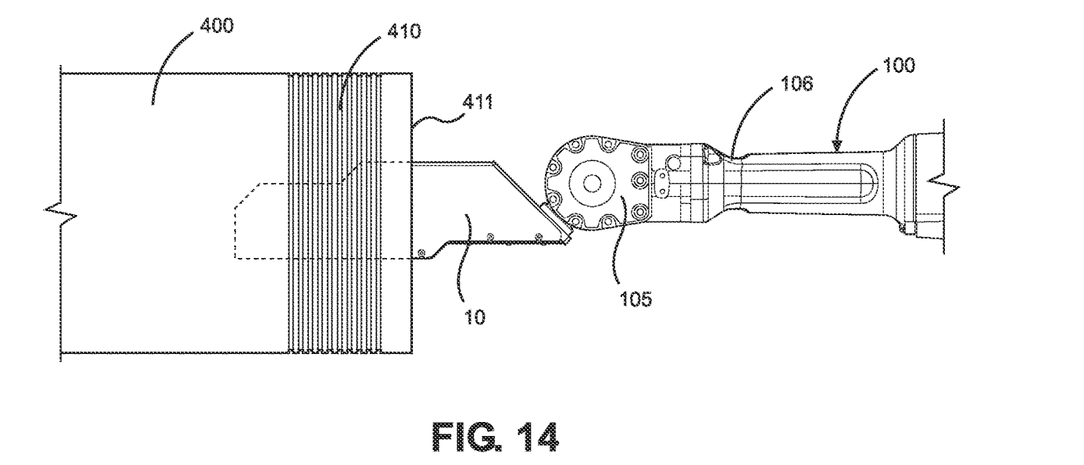
FIG. 14 depicts a fourth side view of a portion of the digital inspection assembly of the present invention during inspection of a pipe section having a conventional threaded connection.

FIG. 14 depicts a fourth side view of a portion of digital inspection assembly 200 of the present invention during inspection of a pipe section 400 having a threaded connection 410 and end face/surface 411. As depicted in FIG. 14, the longitudinal axis of sensor head apparatus 10 is oriented substantially parallel to the longitudinal axis of pipe section 400, while a portion of sensor head apparatus 10 is received within the central through bore of said pipe section 400. In this manner, said sensor head apparatus 10 can access and inspect portions of the inner surfaces of said pipe section 400, including portions of said inner surfaces adjacent or in proximity to threaded connection 410.

Figure 15:
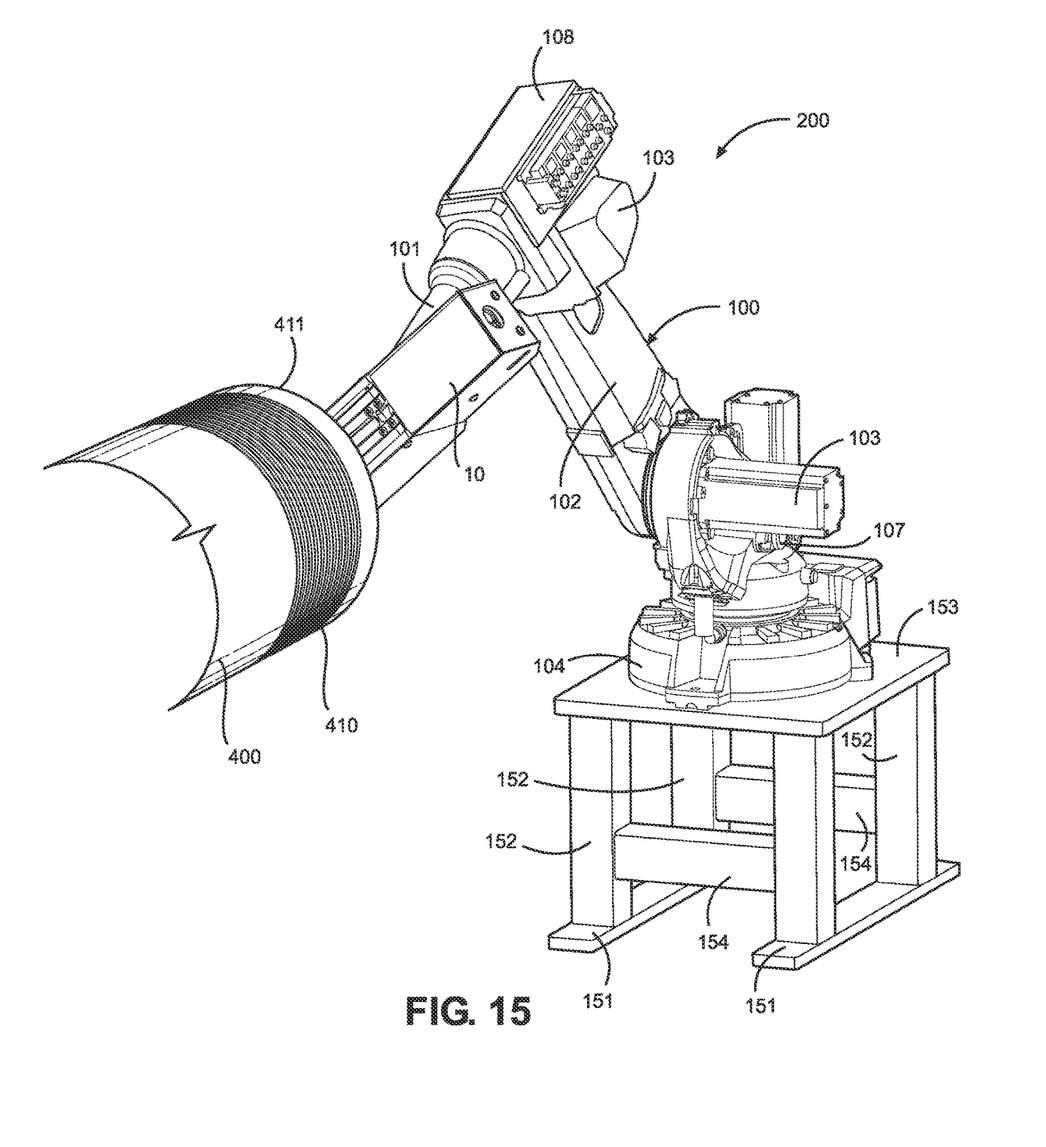
FIG. 15 depicts a perspective end view of a portion of the digital inspection assembly of the present invention during inspection of a pipe section having a conventional threaded connection.

FIG. 15 depicts a perspective side view of a portion of digital inspection assembly 200 of the present invention during inspection of a pipe section 400 having a threaded connection 410 and end face/surface 411. As depicted in FIG. 15, sensor head apparatus 10 is positioned substantially adjacent to the end of said pipe section 400. Further, in the configuration depicted in FIG. 15, the longitudinal axis of said elongated sensor head apparatus 10 is oriented substantially perpendicular to the longitudinal central axis of pipe section 400. In this manner, said sensor head apparatus 10 can access and inspect the outer end face/surface 411 of said pipe section 400 and threaded connection 410.

Digital inspection assembly 200 provides for self-centering, auto-focus and desired alignment of said digital sensor head apparatus 10 relative to pipe section 400 and any associated threaded connection(s), such as threaded connection 410 and outer end face/surface 411. Modular design of digital inspection assembly 200 allows for incorporation of additional components and complete remote automation control. In a preferred embodiment, the digital inspection assembly 200 of the present invention can be operated and utilized by a single person. Further, digital inspection assembly 200 is accurately repeatable (that is, duplicate inspections of the same pipe/connection will yield identical results within predetermined tolerances).

In operation, tubular goods and connections can be cleaned, prepared for a digital inspection process and, when necessary, moved to an inspection station. Digital inspection assembly 200 can be calibrated in accordance with applicable specifications or predetermined standards including, without limitation, for pipe and threaded connections. Pipe or other tubular goods can be moved into a desired position for digital thread inspection by mechanical or human intervention. In a preferred embodiment, integrated and automated racks with centering devices can be utilized, including a 3-point stabilization system to alleviate bending moments in said pipe or other tubular goods.

The present invention can engage pin and box threaded connections simultaneously through remote automation. Proprietary software selectively aligns digital thread inspection assembly 200 including, without limitation digital sensor head apparatus 10, with said threaded connection(s) for optimal imaging and laser sensing and data acquisition. Sensor head apparatus 10 can be selectively repositioned relative to a pipe section and associated threaded connection for purposes of measuring and recording data in accordance herewith.

By way of illustration, but not limitation, automated digital thread inspection assembly 200 of the present invention can capture a 360-degree image and sense data to verify multiple attributes of pipe sections and associated threaded connections in real time. More specifically, the digital inspection assembly 200 of the present invention can permit inspection of multiple attributes of both male and/or female threaded connections and pipe tube bodies including, without limitation, the following: thread image, nose image, seal area, shoulders, relief grooves, roots, crests, pitch (including variable pitch), diameter, pipe outer diameter, pipe inner diameter, pipe ovality and/or other measurable variables. A report containing captured data and any analysis can be automatically generated and forwarded to desired recipients. Measured inspection information can be numbered, timestamped and dated, or otherwise cataloged for storage and/or subsequent retrieval.

Digital thread inspection assembly 200 of the present invention can capture images with digital cameras, lasers scanners or sensors, ultrasonic transducer(s) ('UT") and/or phased array technology via the custom designed robot device and custom control software. Recorded data can be transmitted real time via cables and/or wireless transmission to control station(s) and/or to remote monitoring station(s). Said control station(s) can house computer systems and monitors, with all peripheral equipment associated with the apparatus of the present invention.

Proprietary software can compare all measured and/or input data against predetermined standards or specifications to determine and verify whether measured attributes are within OEM specifications. Defects noted can be highlighted and referenced on graphical image(s) to show position (such as, for example, on a monitor screen) in relation to Azimuth headings on a pipe section or tubular good for quick verification. Further, such defects noted can be stored and, thereafter (such as following any repairs the affected pipe section and/or threaded connection) can be re-inspected using digital thread inspection assembly 200 and compared to a predetermined OEM standard More specifically, measured data can be stored and utilized with an automated pipe grade verification system, and/or stored on a cloud-based data storage system for later retrieval and/or use. Further, such measured data can be accessed for comparison and/or verification of multiple conditions including, without limitation, that threaded connection attributes are within OEM or other predetermined standards for acceptable connection tolerances, that ovality is within desired API or other specifications or standards, and/or that connection tolerances for mating pin and box connections will ensure optimal connection performance in operation. Additionally, data from laser topography and/or digital optical sensor(s) can verify that any defects are within acceptable tolerances relative to OEM specifications and/or other applicable standards. Software and related hardware memory can automatically store all measured or input data received and compare such data to a predetermined standard for a "real time" go/no-go determination. Additionally, a mobile application can be implemented for additional remote access and monitoring.

Additionally, real time data acquisition and Wi-Fi connectivity allows for remote viewing of measured data worldwide (including, without limitation, GSM, 3G, 4G, 5G, Bluetooth, Wi-Fi, satellite and/or cabled networks). PDF or other specific application conversion of all images, lengths, defects, acceptance criteria and all system set up parameters for electronic report generation and delivery to desired recipient(s). Said assembly can beneficially operate using external power and does not require an internal battery for operation.

In one embodiment, two opposing digital inspection assemblies 200 can be utilized (for example, one at each end of a pipe section), wherein movement, operation and control of said opposing digital inspection assemblies can be synchronized with each other for inspection optimization. In such scenarios, multiple threaded connections can be inspected simultaneously, with lighting, imaging, motor automation and laser applications working together, while being controlled from a common or central control panel.

Figure 16:
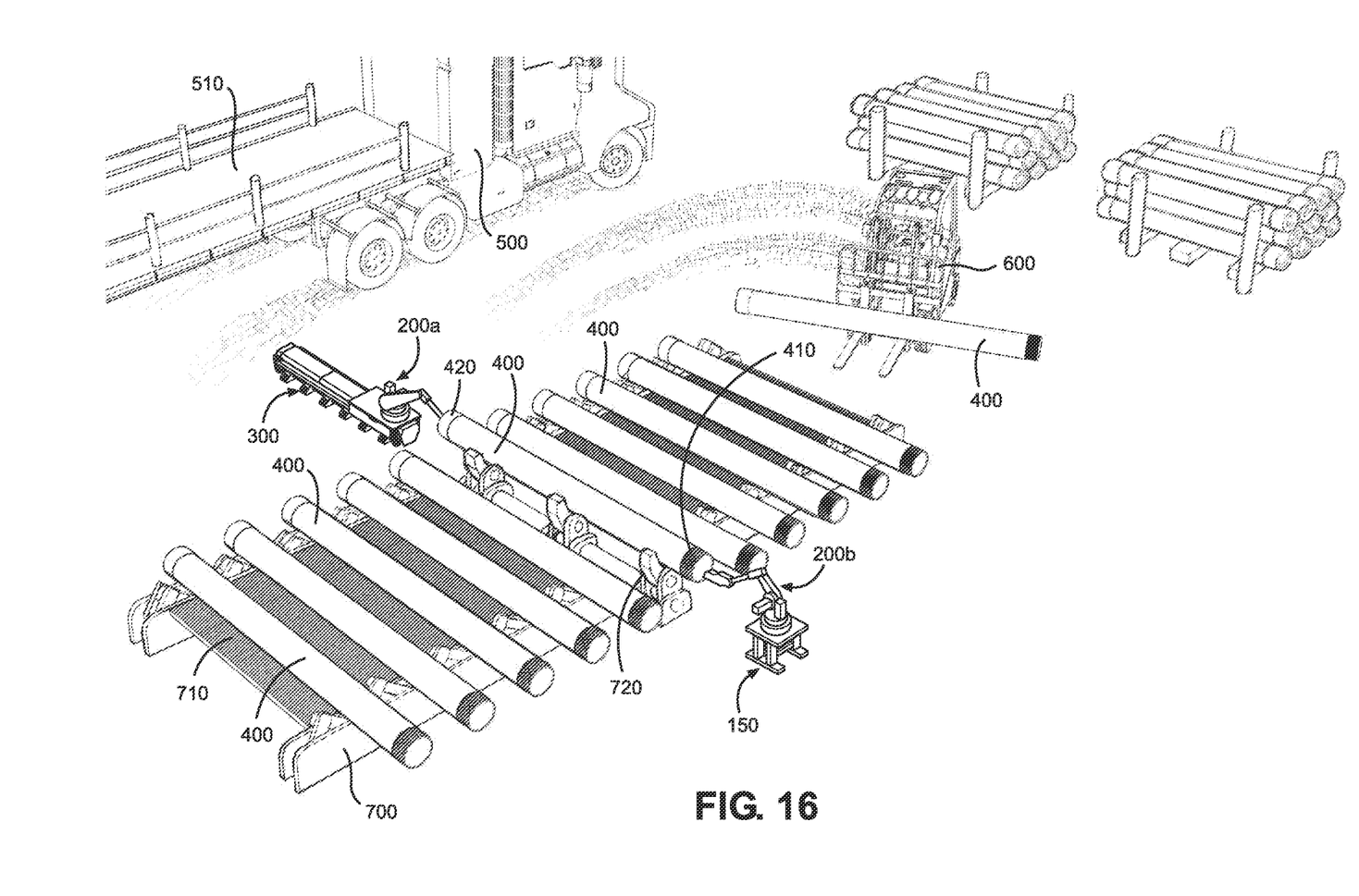
FIG. 16 depicts a perspective view of a plurality of digital inspection assemblies of the present invention during inspection of a pipe section, such as at a pipe rack.

FIG. 16 depicts a perspective view of a plurality of digital inspection assemblies (200a and 200b) of the present invention during inspection of pipe sections, such as multiple pipe sections 400 disposed on a conventional pipe rack 700. It is to be observed that FIG. 16 depicts an illustrative example but is not intended to be limiting in any way. In the illustrative embodiment depicted in FIG. 16, a plurality of pipe section 400 can be transported to a pipe yard, well site or other remote location via conventional tractor trailer 500 having trailer bed 510. Said pipe sections 400 can be offloaded, moved and positioned as desired using conventional fork lift 600; when desired, pipe sections 400 can be deposited on pipe rack 700. Although other configurations can be envisioned without departing from the scope of the present invention, pipe rack 700 can comprise substantially planar upper surface 710 and pipe positioning mechanism 720 for selectively securing and maneuvering pipe sections 400 that are disposed on said pipe rack 700.

In a preferred embodiment, a first digital inspection assembly 200a can be track mounted on a separate remote-controlled and robotic positioning system 300, while a second digital inspection assembly 200b can be in a "fixed" or stationary position, such as on stationary riser platform 150. Although other remote-controlled and robotic positioning systems can be used, in a preferred embodiment said remote-controlled and robotic positioning system 300 can comprise an automated track system such as, for example, the "IRBT 2005" automated robotic track system marketed by ABB. Said robotic positioning system 300 allows for quick, efficient and accurate positioning of a first digital inspection assembly 200a relative to a pipe section 400, as well as repositioning of said first digital inspection assembly 200a when required. Put another way, said first track-mounted digital inspection assembly 200a can selectively move along said robotic positioning system 300 (relative to a pipe section being inspected) in order to accommodate quick and efficient inspection of multiple pipe sections having different or varying lengths with minimal downtime or stoppage of said inspection operations.

In the configuration depicted in FIG. 16, two opposing digital inspection assemblies 200a and 200b (each of which can be a version of digital inspection assembly 200 discussed in detail herein) can be utilized simultaneously; a first digital inspection assembly 200a can be positioned at one end of a pipe section 400 positioned on pipe rack 700, while a second digital inspection assembly 200b can be positioned at the opposite end of said pipe section 400. In a preferred embodiment, movement, control and operation of said opposing digital inspection assemblies 200a and 200b can be synchronized with each other for optimized inspection of a pipe section 400 disposed on pipe rack 700. More specifically, in the configuration depicted in FIG. 16, external threads of male threaded connection 410, as well internal threads of female threaded connection of collar member 420, can be inspected simultaneously using said opposing digital pipe inspection assemblies 200a and 200b. Said inspections can be performed using lighting, imaging, motor automation and laser applications of digital inspection assemblies 200a and 200b described herein, and synchronized when desired, all while being selectively controlled from a common or central control panel.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment", "one embodiment", "some embodiments", "various embodiments," or "other embodiments" means that a particular feature, structure, or characteristic described in connection with the embodiments is included in at least some embodiments, but not necessarily all embodiments, of the present techniques. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics and the like described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

The above-described invention has a number of particular features that should preferably be employed in combination, although each is useful separately without departure from the scope of the invention. While the preferred embodiment of the present invention is shown and described herein, it will be understood that the invention may be embodied otherwise than herein specifically illustrated or described, and that certain changes in form and arrangement of parts and the specific manner of practicing the invention may be made within the underlying idea or principles of the invention.

What is claimed:

1. A digital inspection apparatus for inspecting a threaded connection of a pipe section comprising:
   a) an automated articulated robotic arm assembly comprising:
      i) a first arm member;
      ii) a second arm member;
      iii) a pivotal joint connection between said first and second arm members;
      iv) a computerized robotic control system configured to control motion of said automated articulating robotic arm assembly;
   b) an elongated sensor head apparatus operationally attached to said automated articulated robotic arm assembly; and
   c) at least one data acquisition sensor operationally attached to said sensor head apparatus and configured to acquire data regarding said threaded connection;
   d) at least two lasers operationally attached to said sensor head apparatus and configured to measure positioning of said elongated sensor head apparatus relative to said pipe section;
   wherein said automated articulated robotic arm assembly is configured to selectively position said at least one data acquisition sensor of said sensor head apparatus relative to said threaded connection, and to insert said elongated sensor head apparatus in a central through bore of said pipe section without contacting said pipe section.

2. The digital inspection apparatus of claim 1, wherein said at least one data acquisition sensor comprises a digital camera, laser scanner, optical sensor, ultrasonic transducer, or some combination thereof.

3. The digital inspection apparatus of claim 2, wherein said acquired data comprises at least one optical image of threads, thread nose, seal area, shoulders, relief grooves, roots, crests, pitch, pipe outer diameter, pipe inner diameter, pipe ovality, pipe overall length or some combination thereof.

4. The digital inspection apparatus of claim 3, wherein said pitch data includes variable pitch.

5. The digital inspection apparatus of claim 1, wherein said at least one data acquisition sensor is configured to measure the length, the internal diameter and ovality of said pipe section.

6. The digital inspection apparatus of claim 1, wherein said sensor head apparatus further comprises:
   a) a frame member configured for supporting said at least one data acquisition sensor; and
   b) a cover member configured to protect said at least one data acquisition sensor.

7. A method for inspecting a threaded connection of a pipe section comprising:
   a) providing a digital inspection assembly, wherein said digital inspection assembly comprises:
      i) an articulated robotic arm assembly comprising:
         aa) a first arm member;
         bb) a second arm member;
         cc) a pivotal joint connection between said first and second arm members;
         dd) a computerized robotic control system configured to control motion of said automated articulated robotic arm assembly;
      ii) a sensor mounting assembly operationally attached to said automated articulated robotic arm assembly; and
      iii) at least one data acquisition sensor operationally attached to said sensor mounting assembly and configured to acquire data regarding said threaded connection;
      iv) at least two lasers operationally attached to said sensor head apparatus and configured to measure positioning of said elongated sensor head apparatus relative to said pipe section, wherein said automated articulated robotic arm assembly is configured to selectively position said at least one data acquisition sensor of said sensor head apparatus relative to said threaded connection and to insert said elongated sensor head apparatus in a central through bore of said pipe section without contacting said pipe section;
   b) acquiring data regarding said threaded connection using said at least one data acquisition sensor.

8. The method of claim 7, wherein said at least one data acquisition sensor comprises a digital camera, laser scanner, optical sensor, ultrasonic transducer, or some combination thereof.

9. The method of claim 8, wherein said acquired data comprises at least one optical image of threads, thread nose, seal area, shoulders, relief grooves, roots, crests, pitch, pipe outer diameter, pipe inner diameter, pipe ovality or some combination thereof.

10. The method of claim 9, wherein said pitch data includes variable pitch.

11. The method of claim 7, wherein said at least one data acquisition sensor is configured to measure the length, the internal diameter and ovality of said pipe section.

12. The method of claim 7, wherein said sensor head apparatus further comprises:

a) a frame member configured for supporting said at least one data acquisition sensor; and
b) a cover member configured to protect said at least one data acquisition sensor.

13. The method of claim 7, further comprising comparing said acquired data against predetermined value.

14. The method of claim 13, further comprising determining whether a variance between said acquired data and said predetermined value falls within a predetermined acceptable range.

* * * * *